United States Patent [19]

Alessio

[11] 4,027,546
[45] June 7, 1977

[54] SPEED CHANGING DEVICE FOR TOOLS HAVING A GEAR ASSEMBLY WITH A VARIABLE GEAR RATIO

[75] Inventor: Lorenzo Ercole Alessio, Cairoli, Italy

[73] Assignee: The Black and Decker Manufacturing Company, Towson, Md.

[22] Filed: June 2, 1976

[21] Appl. No.: 692,212

[30] Foreign Application Priority Data

June 12, 1975 Italy .................................. 24324/75
June 12, 1975 Italy .................................. 21672/75

[52] U.S. Cl. .................................. 74/325; 74/421 A
[51] Int. Cl.$^2$ ...................... F16H 1/12; F16H 3/08; B60K 20/10
[58] Field of Search .................. 74/421 A, 325, 335

[56] References Cited
UNITED STATES PATENTS

| | | | |
|---|---|---|---|
| 2,350,631 | 6/1944 | Mitchell | 74/421 A |
| 2,963,913 | 12/1960 | Wensloff | 74/421 A X |
| 3,303,366 | 2/1967 | Elson et al. | 74/421 A X |

*Primary Examiner*—Leonard H. Gerin
*Attorney, Agent, or Firm*—Walter Ottesen; Edward D. Murphy; Leonard Bloom

[57] ABSTRACT

The invention is directed to a speed-changing device for a tool having a gear-box housing and a gear assembly arranged in the housing. The gear assembly has a gear cluster which is movable between at least two positions for changing the gear ratio of the gear assembly. The speed-changing device includes an annular guide member adapted to snap into an opening in the gear-box housing for firmly holding the device in the housing. A cylindrical member is rotatably mounted in the annular guide member and defines a longitudinal axis of rotation. A head piece is securely mounted on the cylindrical member and has an elongated projection extending therefrom eccentric to this axis. The elongated projection engages the gear cluster to move the same from one position to another in response to a manual actuation of the cylindrical member. The cylindrical member is configured to contact the guide member to conjointly define therewith a sealing interface. A resilient member is interposed between the head piece and the guide member for resiliently loading the cylindrical member with respect to the guide member thereby causing the cylindrical member to press against the guide member at the sealing interface whereby an effective seal between the members is established to prevent lubricating liquid from flowing out between the members from the gear-box housing.

27 Claims, 12 Drawing Figures

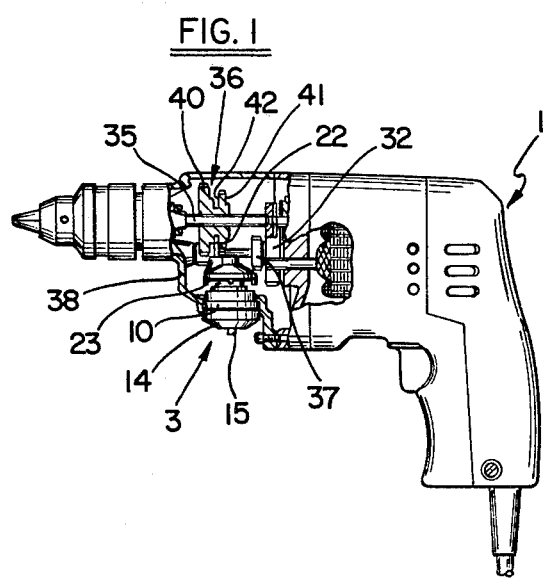
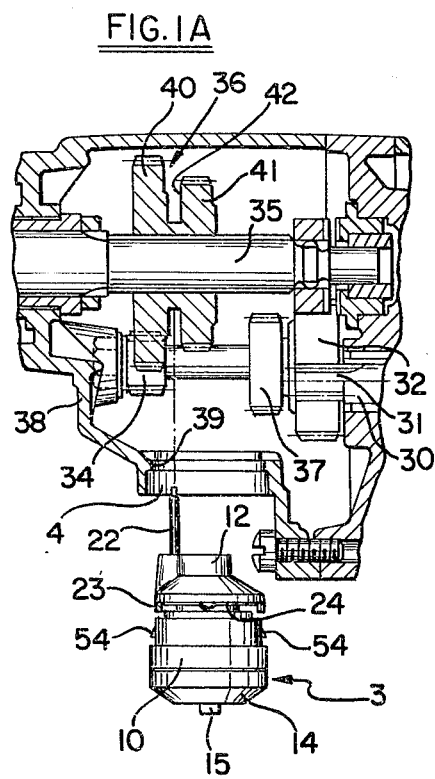
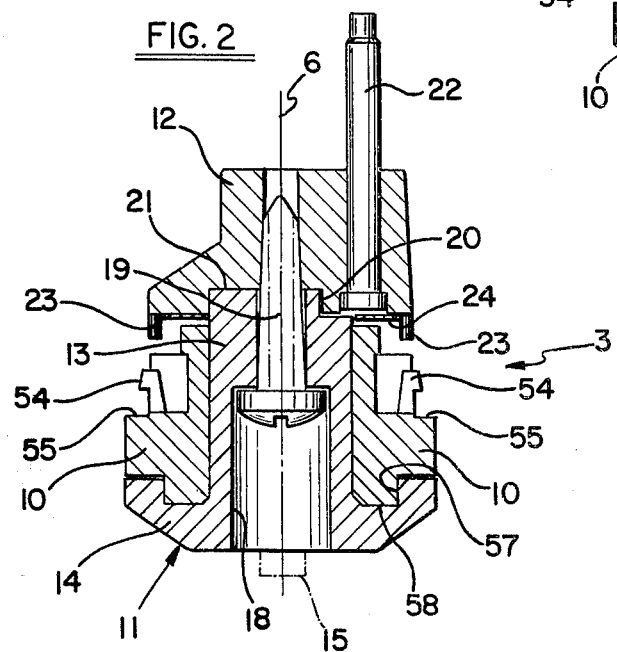
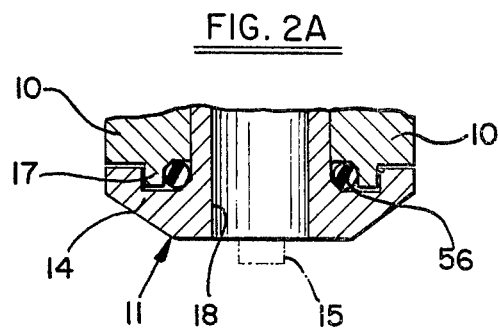

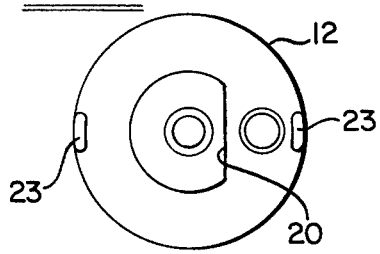
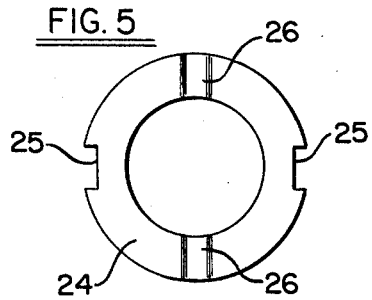
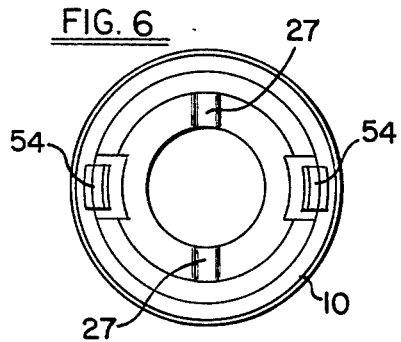
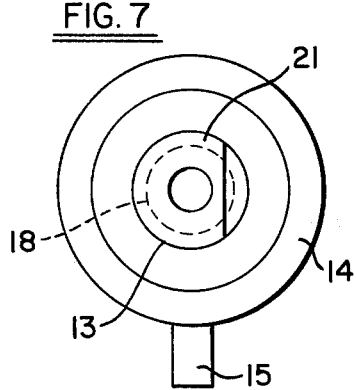
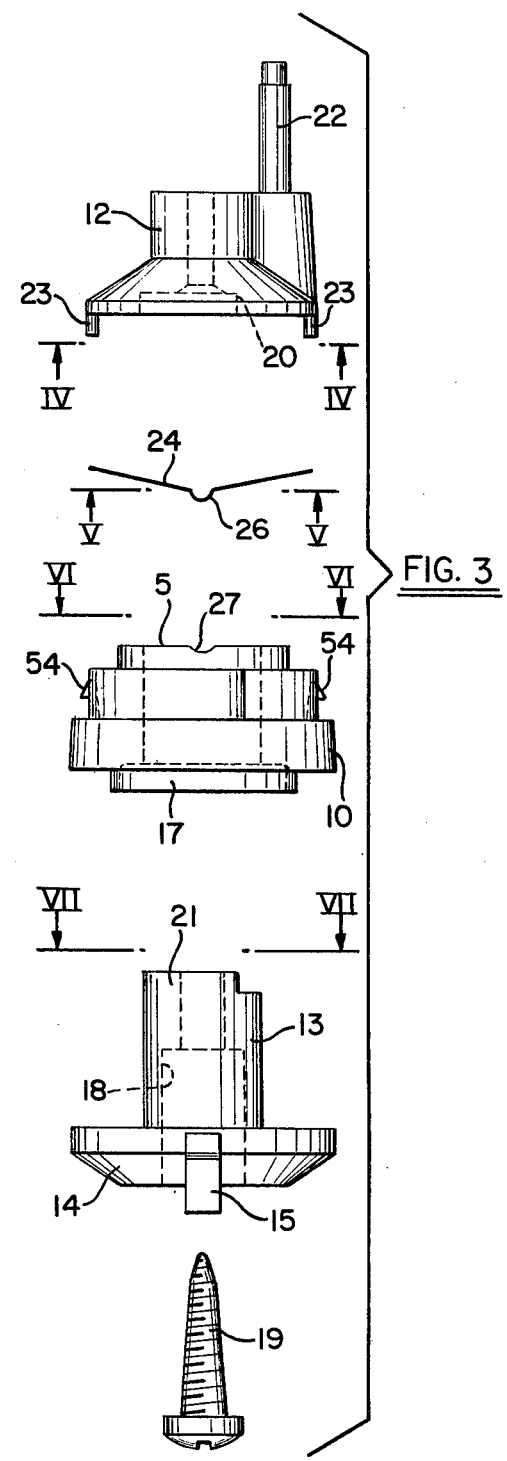

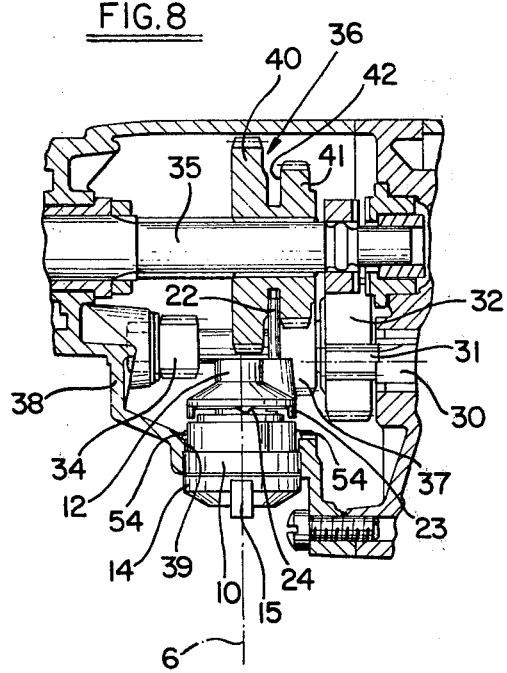
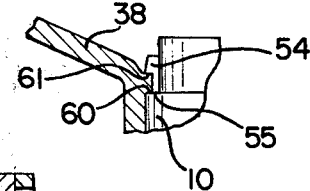
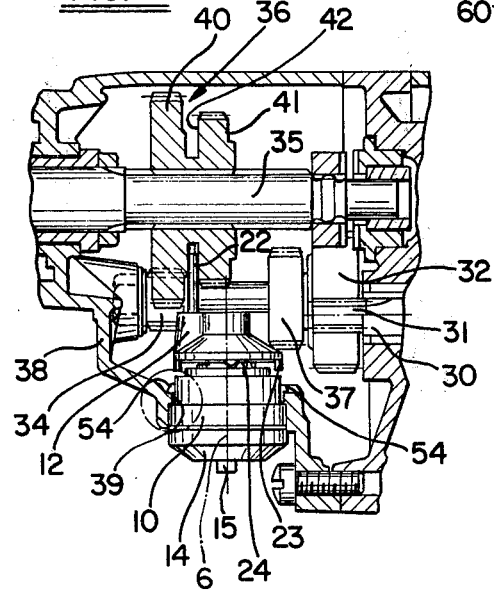

SPEED CHANGING DEVICE FOR TOOLS HAVING A GEAR ASSEMBLY WITH A VARIABLE GEAR RATIO

BACKGROUND OF THE INVENTION

The invention relates to a device for changing the gear ratio on tools having a gear assembly with variable gear ratio and is especially applicable to portable tools of the type in which an output shaft from the motor is connected to a tool-bearing shaft by means of a sliding clutch.

In tools of this type, the clutch may be shifted between at least two positions in order to engage alternately with two or more gears which have different numbers of teeth and are driven by the motor shaft. The clutch is generally shifted by means of a control device actuated externally of the tool housing.

Various devices have been proposed which engage a gear cluster for moving the same between at least two positions for changing the gear ratio of the gear assembly. For example, U.S. Pat. No. 3,880,015 discloses a speed-changing device for effecting axial shifting of gears in a transmission assembly. The speed-changing device is fixedly mounted with the aid of screws into the wall of the gear-box housing. However, such devices require time for assembling the unit and for mounting in the gear-box wall.

Accordingly, it is an object of my invention to provide a device for changing the gear ratio in the gear assembly of a tool which is easily inserted into the wall of the gear-box housing without the need for additional fastening means. It is a further object of my invention to provide such a device which can be merely inserted by a snap action whereby the device is resiliently held within the gear-box housing. It is still another object of the invention to provide such a device which, in addition to being easily insertable, is also effective in preventing the lubricating fluid from flowing out of the gear-box housing.

It is still another object of the invention to provide such a device which can be manufactured at low cost.

SUMMARY OF THE INVENTION

The device according to my invention is applicable to tools having an output shaft which is driven by a motor through a gear assembly having gear means movable between at least two positions for changing the gear ratio of the gear assembly. The device of my invention includes a guide member securely mounted in an appropriate opening in the gear-box housing. A cylindrical member rotatably engages the annular guide member and a portion thereof extends beyond the housing to facilitate the manual rotation of this cylindrical member relative to the guide member. Eccentric means are arranged at the other end of the cylindrical member for engaging the gear means to move the same from one of its positions to the other one of its positions in response to the manual actuation of the cylindrical member. Seal means are formed on the cylindrical member and the annular guide member for sealing the gear-box housing with respect to the ambient and a resilient member is interposed between the cylindrical member and the annular guide member for applying a resilient force to the seal means whereby an effective seal between the members is established to prevent lubricating liquid from flowing out of the gear-box housing.

According to another feature of the invention, resilient arms can be formed on the annular guide member to facilitate a snap-in insertion of the guide member when the device is inserted into the gear-box housing. Thus, with a simple hand movement, the device according to the invention is securely mounted in the gear-box housing thereby effecting substantial savings in labor and time during manufacture of the tool incorporating the device of the invention. Further, the resilient member applying force between the guide member and the cylindrical member insures a good sealing effect between these two members thereby preventing lubricating fluid from running out of the gear-box. In addition, the parts of the device of the invention can be made of plastic which enables the device itself to be produced at low cost.

The above objectives and advantages of my invention will become more apparent from a consideration of the detailed description to follow taken in conjunction with the drawing annexed hereto.

BRIEF DESCRIPTION OF THE DRAWING

FIG. 1 is a view of a portable electric drill equipped with a speed-changing device according to the invention.

FIG. 1A shows the speed-changing device lined up with an opening in the gear-box housing wall and ready for insertion.

FIG. 2 is an elevation view, partially in section, illustrating the speed-changing device.

FIG. 2A shows how a sealing ring can be used to effect a seal between the stationary and movable parts of the speed-changing device according to an alternate embodiment of the invention.

FIG. 3 shows an exploded view of the device of FIG. 2.

FIG. 4 is a view of the head in the direction IV—IV of FIG. 3.

FIG. 5 is a plan view of the resilient ring in the direction V—V in FIG. 3.

FIG. 6 is a plan view of the guide member in the direction VI—VI in FIG. 3.

FIG. 7 is a plan view in the direction VII—VII in FIG. 3.

FIGS. 8 and 9 are longitudinal sections taken through the electric drill of FIG. 1 at the location of the speed-changing device showing the speed-changing device in two different operative positions.

FIG. 10 is an exploded view of the encircled portion of FIG. 9.

DESCRIPTION OF THE PREFERRED EMBODIMENTS OF THE INVENTION

Referring now to the drawing, FIG. 1 shows a portable electric drill 1 having a motor 2. The speed-changing device 3 according to the invention is shown seated in the gear-box housing of the drill. In FIG. 1A, the speed-changing device is depicted ready for insertion into the opening 4 of the gear-box housing.

The device according to the invention is shown assembled in FIG. 2 and includes an annular guide member 10, a member 11 inserted rotatably into the guide member 10, and a head piece 12 secured to member 11.

As may be seen in FIGS. 2, 3 and 6, member 11 has a cylindrical portion 13 guided rotatably in guide 10 and an end-flange portion 14 from which a manual-control arm 15 projects.

As shown in FIG. 2, in member 11 there is a central seat 18 configured to accommodate fastening means in the form of a screw 19 which serves to connect member 11 with heat piece 12 (FIG. 2) and makes member 11 integral with head piece 12.

In order to prevent member 11 and head piece 12 from rotating in relation to each other, head piece 12 is provided with a recess 20 in the form of a segment of a circle matching a projection 21 on member 11 (FIGS. 4 and 7).

Head piece 12 carries a pin 22 which is eccentric in relation to the axis of rotation 6 of member 11 and which projects above head piece 12 to engage gear means in the form of gear cluster 36 of the gear assembly of the tool as shown in FIGS. 8 and 9. Thus, the head piece 12 with pin 22 constitutes eccentric means for engaging the gear means. The head piece 12 is also equipped with two diametrically opposite teeth 23 for accommodating therebetween resilient means in the form of a resilient ring 24 (FIG. 5) having recesses 25 corresponding to the teeth 23.

Ring 24 is provided with diametrically opposite protuberances 26 matching notches 27 located on the corresponding outer end-face 5 of guide member 10.

The portions of ring 24 extending away from the protuberances 26 are bent upward slightly in relation to the protuberances 26 so that the head piece 12 is resiliently loaded with respect to guide member 10 by ring 24 reacting between head piece 12 and guide member 10 which is fixedly held in the tool. In this way, a constant contact pressure is maintained on the inside of flange 14 thereby preventing the escape of grease. A sealing interface is thereby established between the guide member 10 and the member 11. The sealing interface, for example, can be defined by first sealing surface means including a sealing surface 57 on guide member 10 and second sealing surface means including a sealing surface 58 on member 11 (FIG. 2).

Also arranged on the stepped wall of guide 10 are resilient engaging means in the form of diametrically opposite, resiliently yielding latching fingers 54 for snapping into the opening 4 in the gear-box housing when the speed-changing device is inserted therein.

Referring to FIGS. 2, 8 and 10, a seal between the speed-changing device proper and the gear-box 38 to prevent the escape of lubricant is provided by ancillary sealing means in the form of a sealing interface constituted by surface 55 contacting the edge surface 60 of the gear-box housing 38. The contact is established when the device is inserted into the opening 4 of the gear-box housing 38 and latching teeth 54 bear resiliently against the ledge 61.

As discussed above, a seal between the two contacting surfaces 57 and 58 (FIG. 2) is also established to likewise prevent the leakage of lubricating fluid from the gear-box housing. If desired, the two contacting surfaces 57, 58 shown in FIG. 2 can be replaced by a sealing ring 56 as shown in FIG. 2A.

FIGS. 8 and 9 show the positions corresponding to the limits of travel of the speed-changing device according to the invention and the corresponding positions of the gear cluster 36 for two different speeds of the chuck shaft.

The speed of the chuck shaft with the device according to the invention is controlled simply by manually rotating arm 15 from a position where the protuberances 26 engage notices 27 through an angle of 180° until the protuberances 26 again engage the notches 27; this makes it possible to alter the clutch engagement from the position shown in FIG. 8 to that shown in FIG. 9. In the position of FIG. 8, gear 41 of the gear cluster 36 engages gear 37; whereas, in FIG. 9, gear 40 of gear cluster 36 engages gear 34.

Fitting of the speed-changing device shown assembled in FIG. 2 to the tool gear-box 38 is effected by simply inserting the device into aperture 4 in a manner such that teeth 54 engage in wall 38 of the gear-box housing. Thus, it is seen that the device according to the invention can be inserted rapidly and simply into the tool gear-box and also affords an adequate seal to prevent loss of lubricant.

The device according to the invention may be made of plastic material by molding which affords a considerable economic advantage.

I claim the following:

1. In a tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:

an annular guide member fixedly mounted to the gear-box housing in said opening thereof;

a cylindrical member rotatably mounted in said annular guide member, said cylindrical member having one end extending outside of the gear-box housing to facilitate manually moving said cylindrical member relative to said guide member;

eccentric means arranged at the other end of said cylindrical member for engaging the gear means to move the same from one of said positions to the other one of said positions in response to the manual actuation of said cylinder member;

seal means formed on said cylindrical member and said annular guide member for sealing the gear-box housing with respect to the ambient; and, resilient means for applying resilient pressure to said seal means whereby an effective seal between said members is established to prevent lubricating liquid from flowing out between said members from the gear-box housing.

2. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:

an annular guide member insertably mounted in the gear-box housing in said opening thereof;

a cylindrical member rotatably mounted in said annular guide member, said cylindrical member having one end extending outside of the gear-box housing;

means formed at said one end of said cylindrical member for facilitating the manual rotational movement of said cylindrical member relative to said guide member;

eccentric means arranged at the other end of said cylindrical member for engaging the gear means to move the same from one of said positions to the other one of said positions in response to the manual actuation of said cylinder member;

first sealing surface means formed on said annular guide member;

second sealing surface means formed on said cylinder member in the region of said one end thereof; and, resilient means interposed between said cylinder member and said annular guide member for pressing said second sealing surface means against said first sealing surface means whereby an effective seal between said members is established to prevent lubricating liquid from flowing out of the gear-box housing.

3. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:

an annular guide member;

resilient engaging means formed on said annular guide member for engaging the gear-box housing for firmly holding the device thereon when said device is inserted into said opening of the gear-box housing;

a cylindrical member rotatably mounted in said annular guide member, said cylindrical member having one end extending outside of the gear-box housing;

means formed at said one end of said cylindrical member for facilitating the manual rotational movement of said cylindrical member relative to said guide member;

eccentric means arranged at the other end of said cylindrical member for engaging the gear means to move the same from one of said positions to the other one of said positions in response to the manual actuation of said cylinder member; and, seal means formed on said cylindrical member and said annular guide member for sealing the gear-box housing with respect to the ambient.

4. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:

an annular guide member;

resilient engaging means formed on said annular guide member for engaging the gear-box housing for firmly holding the device thereon when said guide member is inserted into said opening of the gear-box housing;

a cylindrical member rotatably mounted in said annular guide member, said cylindrical member having one end extending outside of the gear-box housing to facilitate manually rotating said cylindrical member relative to said guide member;

eccentric means arranged at the other end of said cylindrical member for engaging the gear means to move the same from one of said positions to the other one of said positions in response to the manual actuation of said cylinder member;

first sealing surface means formed on said annular guide member;

second sealing surface means formed on said cylinder member in the region of said one end thereof; and resilient means interposed between said cylinder member and said annular guide member for pressing said second sealing surface means against said first sealing surface means whereby an effective seal between said members is established to prevent lubricating liquid from flowing out of the gear-box housing.

5. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:

an annular guide member;

a cylindrical member rotatably mounted in said annular guide member, said cylindrical member having one end extending outside of the gear-box housing;

means formed at said one end of said cylindrical member for facilitating the manual rotational movement of said cylindrical member relative to said guide member;

eccentric means arranged at the other end of said cylindrical member for engaging the gear means to move the same from one of said positions to the other one of said positions in response to the manual actuation of said cylinder member;

first sealing surface means formed on said annular guide member;

second sealing surface means formed on said cylinder member in the region of said one end thereof;

resilient means interposed between said cylinder member and said annular guide member for pressing said second sealing surface means against said first sealing surface means whereby an effective seal between said members is established to prevent lubricating liquid from flowing out therebetween from the gear-box housing;

resilient engaging means formed on said annular guide member for engaging the gear-box housing for firmly holding the device thereon when said guide member is inserted into said opening of the gear-box housing; and, ancillary sealing means formed on said gear-box housing and on said guide member for sealing the gear-box housing to prevent lubricating liquid from flowing out between said guide member and the gear-box housing.

6. The device of claim 5, said ancillary sealing means including a sealing surface formed on the gear-box housing and an additional sealing surface formed and disposed on said guide member so as to cause said last-mentioned surfaces to engage when said device is inserted into the gear-box housing; and, said resilient engaging means being configured to engage the gear-box housing so as to cause said additional sealing surface to bear resiliently against said sealing surface formed on the gear-box housing when said device is inserted into said opening of the gear-box housing.

7. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:
- an annular guide member;
- resilient engaging means formed on said annular guide member for engaging the gear-box housing for firmly holding the device thereon when said guide member is inserted into said opening of the gear-box housing;
- a cylindrical member rotatably mounted in said annular guide member, said cylindrical member having one end extending outside of the gear-box housing;
- flange means formed at said one end of said cylindrical member so as to be exterior of the gear-box housing for facilitating the manual rotational movement of said cylindrical member relative to said guide member;
- eccentric means arranged at the other end of said cylindrical member for engaging the gear means to move the same from one of said positions to the other one of said positions in response to the manual actuation of said cylinder member;
- fastening means for tightly securing said eccentric means to said cylindrical member;
- first sealing surface means formed on said annular guide member;
- second sealing surface means formed on said flange means of said cylinder member; and,
- resilient means interposed between said cylinder member and said annular guide member for resiliently pressing said second sealing surface means against said first sealing surface means whereby an effective seal between said members is established to prevent lubricating liquid from flowing out of the gear-box housing.

8. The device of claim 7, comprising: ancillary sealing means formed on said gear-box housing and on said guide member for sealing the gear-box housing to prevent lubricating liquid to flow out between said guide member and the gear-box housing.

9. The device of claim 8, said ancillary sealing means including a sealing surface formed on the gear-box housing and an additional sealing surface formed and disposed on said guide member so as to cause said last-mentioned surfaces to engage when said device is inserted into the gear-box housing; and, said resilient engaging means being configured to engage the gear-box housing so as to cause said additional sealing surface to bear resiliently against said sealing surface formed on the gear-box housing when said device is inserted into said opening of the gear-box housing.

10. In a portable tool having an output shaft, a gear-box housing having an opening formed therein, a gear assembly disposed in the gear-box housing and having gear means movable between at least two positions for changing the gear ratio of the gear assembly, a motor for driving the output shaft through the gear assembly, and a device for moving the gear means to change the gear ratio, the device comprising:
- an annular guide member having first and second end-faces at respective longitudinal ends thereof;
- resilient latching fingers formed on said annular guide member for snapping into said opening to engage the gear-box housing for firmly holding the device therein when said device is inserted into said opening of the gear-box housing so as to cause one of said end-faces to face toward the gear assembly;
- a cylindrical member rotatably mounted in said annular guide member and defining a longitudinal axis of rotation, said cylindrical member having one end extending outside of the gear-box housing to facilitate manually rotating said cylindrical member relative to said guide member;
- a head piece mounted upon said cylinder member, said head piece having an elongated projection formed thereon eccentric to said axis and extending outwardly to engage said gear means to move the same from one of said positions to the other one of said positions in response to the manual actuation of said cylinder member;
- fastening means for tightly securing said head piece to said cylindrical member;
- said cylindrical member having a flanged portion formed thereon at said one end thereof, said flanged portion being configured so as to contact the other one of said end-faces of said guide member to conjointly define therewith a sealing interface; and,
- a resilient member interposed between said head piece and said one end-face of said guide member for resiliently loading said cylinder member with respect to said guide member so as to cause said flanged portion to press against said other one of said end-faces of said guide member whereby an effective seal between said members is established at said interface to prevent lubricating liquid from flowing out between said members from the gear-box housing.

11. The device of claim 10 said one end-face having at least two notches formed therein; said resilient member being a ring made of flat resilient material formed so as to have at least two protuberances corresponding to said notches respectively, said ring being bent to apply a resilient force between said head piece and said guide member so as to cause said flanged portion to press against said other one of said end-faces of said guide member whereby an effective seal between said members is established at said interface to prevent lubricating liquid from flowing out between said members, said ring being keyed to said head-piece so as to cause said cylinder member to be in a rotational position corresponding to one of said two positions of said gear means when said protuberances engage said notches.

12. The device of claim 11 comprising: ancillary sealing means formed on said gear-box housing and on said guide member for sealing the gear-box housing to prevent lubricating liquid from flowing out between said guide member and the gear-box housing.

13. The device of claim 12, said ancillary sealing means including a sealing surface formed on the gear-box housing and an additional sealing surface formed and disposed on said guide member so as to cause said last-mentioned surfaces to engage when said device is inserted into the gear-box housing; and, said resilient engaging means being configured to engage the gear-box housing so as to cause said additional sealing surface to bear resiliently against said sealing surface formed on the gear-box housing when said device is inserted into said opening of the gear-box housing.

14. A speed-changing device for a tool having a gear-box housing and a gear assembly arranged in the housing, the gear assembly having gear means movable between at least two positions for changing the gear ratio of the gear assembly, the speed-changing device comprising:
an annular guide member fixedly mounted in an opening of the gear-box housing;
a cylindrical member rotatably mounted in said annular guide member, said cylindrical member having one end extending outside of the gear-box housing to facilitate manually moving said cylindrical member relative to said guide member;
eccentric means arranged at the other end of said cylindrical member for engaging the gear means to move the same from one of said positions to the other one of said positions in response to the manual actuation of said cylinder member;
seal means formed on said cylindrical member and said annular guide member for sealing the gear-box housing with respect to the ambient; and,
resilient means for applying resilient pressure to said seal means whereby an effective seal between said members is established to prevent lubricating liquid from flowing out between said members from the gear-box housing.

15. A speed-changing device for a tool having a gear-box housing amd a gear assembly arranged in the housing, the gear assembly having gear means movable between at least two positions for changing the gear ratio of the gear assembly, the speed-changing device comprising:
an annular guide member insertably mounted in the gear-box housing;
a cylindrical member rotatably mounted in said annular guide member, said cylindrical member having one end extending outside of the gear-box housing to facilitate the manual rotational movement of said cylindrical member relative to said guide member;
eccentric means arranged at the other end of said cylindrical member for engaging the gear means to move the same from one of said positions to the other one of said positions in response to the manual actuation of said cylinder member;
first sealing surface means formed on said annular guide member;
second sealing surface means formed on said cylinder member in the region of said one end thereof; and,
resilient means interposed between said cylinder member and said annular guide member for pressing said second sealing surface means against said first sealing surface means whereby an effective seal between said members is established to prevent lubricating liquid from flowing out of the gear-box housing.

16. A speed-changing device for a portable electric tool having a gear-box housing and a gear assembly arranged in the housing, the gear assembly having gear means movable between at least two positions for changing the gear ratio of the gear assembly, the speed-changing device comprising:
an annular guide member;
resilient engaging means formed on said annular guide member for engaging the gear-box housing for firmly holding the device thereon when said guide member is inserted into an opening of the gear-box housing;
a cylindrical member rotatably mounted in said annular guide member, said cylindrical member having one end extending outside of the gear-box housings to facilitate manually rotating said cylindrical member relative to said guide member;
eccentric means arranged at the other end of said cylindrical member for engaging the gear means to move the same from one of said positions to the other one of said positions in response to the manual actuation of said cylinder member;
first sealing surface means formed on said annular guide member;
second sealing surface means formed on said cylinder member in the region of said one end thereof; and,
resilient means interposed between said cylinder member and said annular guide member for pressing said second sealing surface means against said first sealing surface means whereby an effective seal between said members is established to prevent lubricating liquid from flowing out of the gear-box housing.

17. The speed-changing device of claim 16 comprising: ancillary sealing means formed on said gear-box housing and on said guide member for sealing the gear-box housing to prevent lubricating liquid from flowing out between said guide member and the gear-box housing.

18. The speed-changing device of claim 17, said ancillary sealing means including a sealing surface formed on the gear-box housing and an additional sealing surface formed and disposed on said guide member so as to cause said last-mentioned surfaces to engage when said device is inserted into the gear-box housing; and, said resilient engaging means being configured to engage the gear-box housing so as to cause said additional sealing surface to bear resiliently against said sealing surface formed on the gear-box housing when said device is inserted into said opening of the gear-box housing.

19. A speed-changing device for a portable tool having a gear-box housing and a gear assembly arranged in the housing, the gear assembly having gear means movable between at least two positions for changing the gear ratio of the gear assembly, the speed-changing device comprising:
an annular guide member;
resilient engaging means formed on said annular guide member for engaging the gear-box housing for firmly holding the device thereon when said guide member is inserted into an opening of the gear-box housing;
a cylindrical member rotatably mounted in said annular guide member, said cylindrical member having one end extending outside of the gear-box housing;
flange means formed at said one end of said cylindrical member so as to be exterior of the gear-box housing for facilitating the manual rotational movement of said cylindrical member relative to said guide member;
eccentric means arranged at the other end of said cylindrical member for engaging the gear means to move the same from one of said positions to the other one of said positions in response to the manual actuation of said cylinder member;
fastening means for tightly securing said eccentric means to said cylindrical member;
first sealing surface means formed on said annular guide member;
second sealing surface means formed on said flange means of said cylinder member; and, resilient means interposed between said cylinder member and said annular guide member for resiliently pressing said second sealing surface means against said first sealing surface means whereby an effective seal between said members is established to prevent lubricating liquid from flowing out of the gear-box housing.

20. The device of claim 19 comprising: ancillary sealing means formed on said gear-box housing and on said guide member for sealing the gear-box housing to prevent lubricating liquid to flow out between said guide member and the gear-box housing.

21. The device of claim 20, said ancillary sealing means including a sealing surface formed on the gear-box housing and an additional sealing surface formed and disposed on said guide member so as to cause said last-mentioned surfaces to engage when said device is inserted into the gear-box housing; and, said resilient engaging means being configured to engage the gear-box housing so as to cause said additional sealing surface to bear resiliently against said sealing surface formed on the gear-box housing when said device is inserted into said opening of the gear-box housing.

22. A speed-changing device for a portable tool having a gear-box housing and a gear assembly arranged in the housing, the gear assembly having gear means movable between at least two positions for changing the gear ratio of the gear assembly, the gear-ratio changing device comprising:
an annular guide member having first and second end-faces at respective longitudinal ends thereof;
resilient latching fingers formed on said annular guide member for snapping into an opening of the gear-box housing to engage the gear-box housing for firmly holding the device therein when said device is inserted into said opening of the gear-box housing so as to cause one of said end-faces to face toward the gear assembly;
a cylindrical member rotatably mounted in said annular guide member and defining a longitudinal axis of rotation, said cylindrical member having one end extending outside of the gear-box housing to facilitate manually rotating said cylindrical member relative to said guide member;
a head piece mounted upon said cylinder member, said head piece having an elongated projection formed thereon eccentric to said axis and extending outwardly to engage said gear means to move the same from one of said positions to the other one of said positions in response to the manual actuation of said cylinder member;
fastening means for tightly securing said head piece to said cylindrical member;
said cylindrical member having a flanged portion formed thereon at said one end thereof, said flanged portion being configured so as to contact the other one of said end-faces of said guide member to conjointly define therewith a sealing interface; and,
a resilient member interposed between said head piece and said one end-face of said guide member for resiliently loading said cylinder member with respect to said guide member so as to cause said flanged portion to press against said other one of said end-faces of said guide member whereby an effective seal between said members is established at said interface to prevent lubricating liquid from flowing out between said members from the gear-box housing.

23. The device of claim 22 said one end-face having at least two notches formed therein; said resilient member being a ring made of flat resilient material formed so as to have at least two protuberances corresponding to said notches respectively, said ring being bent to apply a resilient force between said head piece and said guide member so as to cause said flanged portion to press against said other one of said end-faces of said guide member whereby an effective seal between said members is established at said interface to prevent lubricating liquid from flowing out between said members, said ring being keyed to said head-piece so as to cause said cylinder member to be in a rotational position corresponding to one of said two positions of said gear means when said protuberances engage said notches.

24. The device of claim 23 comprising: ancillary sealing means formed on said gear-box housing and on said guide member for sealing the gear-box housing to prevent lubricating liquid flowing out between said guide member and the gear-box housing.

25. The device of claim 24, said ancillary sealing means including a sealing surface formed on the gear-box housing and an additional sealing surface formed and disposed on said guide member so as to cause said last-mentioned surfaces to engage when said device is inserted into the gear-box housing and, said resilient engaging means being configured to engage the gear-box housing so as to cause said additional sealing surface to bear resiliently against said sealing surface formed on the gear-box housing when said device is inserted into said opening of the gear-box housing.

26. A speed-changing device for a tool having a gear-box housing and a gear assembly arranged in the housing, the gear assembly having gear means movable between at least two positions for changing the gear ratio of the gear assembly, the speed-changing device comprising:
an annular guide member fixedly mounted in an opening of the gear-box housing;
a cylindrical member rotatably mounted in said annular guide member, said cylindrical member having one end extending outside of the gear-box housing to facilitate manually moving said cylindrical member relative to said guide member;
eccentric means arranged at the other end of said cylindrical member for engaging the gear means to move the same from one of said positions to the other one of said positions in response to the manual actuation of said cylinder member;
a sealing ring disposed between said cylindrical member and said annular guide member for sealing the gear-box housing with respect to the ambient; and,
resilient means for applying resilient pressure to said sealing ring whereby an effective seal between said members is established to prevent lubricating liquid from flowing out between said members from the gear-box housing.

27. A speed-changing device for a portable electric tool having a gear-box housing and a gear assembly arranged in the housing, the gear assembly having gear means movable between at least two positions for changing the gear ratio of the gear assembly, the speed-changing device comprising:
an annular guide member;

resilient engaging means formed on said annular guide member for engaging the gear-box housing for firmly holding the device thereon when said guide member is inserted into an opening of the gear-box housing;

a cylindrical member rotatably mounted in said annular guide member, said cylindrical member having one end extending outside of the gear-box housings to facilitate manually rotating said cylindrical member relative to said guide member;

eccentric means arranged at the other end of said cylindrical member for engaging the gear means to move the same from one of said positions to the other one of said positions in response to the manual actuation of said cylinder member;

a sealing ring disposed between said cylindrical member and said guide member for sealing the gear-box housing with respect to the ambient; and resilient means interposed between said cylinder member and said annular guide member for applying resilient pressure to said sealing ring whereby an effective seal between said members is established to prevent lubricating liquid from flowing out of the gear-box housing.

* * * * *